(12) United States Patent  (10) Patent No.: US 7,584,217 B2
Kasai  (45) Date of Patent: Sep. 1, 2009

(54) PHOTO IMAGE RETRIEVAL SYSTEM AND PROGRAM

(75) Inventor: Tsuneo Kasai, Azumino (JP)

(73) Assignee: Seiko Epson Corporation (JP)

( * ) Notice: Subject to any disclaimer, the term of this patent is extended or adjusted under 35 U.S.C. 154(b) by 411 days.

(21) Appl. No.: 11/360,680

(22) Filed: Feb. 23, 2006

(65) Prior Publication Data

US 2007/0055699 A1  Mar. 8, 2007

(30) Foreign Application Priority Data

Feb. 24, 2005 (JP) ............................. 2005-048634

(51) Int. Cl.
G06F 17/30 (2006.01)
G06F 7/00 (2006.01)
G06F 17/00 (2006.01)

(52) U.S. Cl. ........................................ 707/104.1; 707/3

(58) Field of Classification Search .................. None
See application file for complete search history.

(56) References Cited

U.S. PATENT DOCUMENTS

| 6,415,316 | B1 * | 7/2002 | Van Der Meer | ............ | 709/203 |
| 7,028,253 | B1 * | 4/2006 | Lieberman et al. | .......... | 715/232 |
| 2003/0069893 | A1 | 4/2003 | Kanai et al. | | |
| 2003/0167264 | A1 * | 9/2003 | Ogura et al. | .................... | 707/3 |
| 2005/0055344 | A1 * | 3/2005 | Liu et al. | ........................ | 707/3 |
| 2006/0115108 | A1 * | 6/2006 | Rodriguez et al. | .......... | 382/100 |

FOREIGN PATENT DOCUMENTS

| JP | 2002-101894 | 4/2000 |
| JP | 2002-245061 | 8/2002 |
| JP | 2002-288091 | 10/2002 |
| JP | 2002-288175 | 10/2002 |
| JP | 2002-344721 | 11/2002 |
| JP | 2003-108278 | 4/2003 |
| JP | 2003-271653 | 9/2003 |
| JP | 2003-303210 | 10/2003 |
| JP | 2005-100196 | 4/2005 |

* cited by examiner

Primary Examiner—Charles Rones
Assistant Examiner—Alicia M Lewis
(74) Attorney, Agent, or Firm—Harness, Dickey & Pierce, P.L.C.

(57) ABSTRACT

A photo image retrieval system stores photo images and a text data, and extracts and displays any photo image using an input retrieval sentence as an index. A photo image database records photo images with information about image capture dates. A text database stores text data. A text data analysis unit parses the text data, and extracts words. An index database establishes a correlation between information about words extracted and information about dates when the text data is entered. A retrieval sentence analysis unit parses the input retrieval sentence, and extracts a retrieval word A date information extraction unit extracts information about the date when the text data is entered by referring to the index database. A photo image extraction unit extracts, using the date as an index, any of the photo images captured on the date. A display unit displays the extracted photo image.

6 Claims, 10 Drawing Sheets

| WORD | WORD CLASS | WEIGHT |
|---|---|---|
| SCHOOL SPORTS DAY | NOUN | 10 |
| RECITAL | NOUN | 10 |
| FISHING | NOUN | 5 |
| CONCERT | NOUN | 5 |
| SCHOOL ASSEMBLY ON THE FIRST DAY OF SCHOOL | NOUN | 10 |
| SCHOOL EXCURSION | NOUN | 10 |
| MOVIE | NOUN | 5 |
| DINNER | NOUN | 5 |
| DANCE | NOUN | 5 |
| SEA | NOUN | 5 |

FIG. 6

| Page ID | DATE | URL |
|---|---|---|
| 1 | 2004/10/10 | aaa.bbb.xxx/?user=kasai&date=20041010 |
| 2 | 2004/10/20 | aaa.bbb.xxx/?user=kasai&date=20041020 |
| 3 | 2004/12/03 | aaa.bbb.xxx/?user=kasai&date=20041203 |
| 4 | 2004/12/15 | aaa.bbb.xxx/?user=kasai&date=20041215 |
| 5 | 2005/01/03 | aaa.bbb.xxx/?user=kasai&date=20050103 |

FIG. 7

| WORD ID | WORD | WORD CLASS | WEIGHT |
|---|---|---|---|
| 1 | MOVIE | NOUN | 5 |
| 2 | LOOK | VERB | 1 |
| 3 | DELAYED | VERB | 1 |
| 4 | FUN | ADJECTIVE | 1 |
| 5 | SCHOOL SPORTS DAY | NOUN | 10 |
| 6 | DVD | NOUN | 1 |
| 7 | BUY | VERB | 1 |
| 8 | PLAY | VERB | 1 |
| 9 | TRAIN | NOUN | 1 |
| 10 | GO OUT | VERB | 1 |

FIG. 8

| Page ID | WORD ID | FREQUENCY |
|---|---|---|
| 1 | 1 | 1 |
| 1 | 2 | 2 |
| 1 | 3 | 5 |
| 1 | 4 | 1 |
| 2 | 2 | 1 |
| 2 | 3 | 2 |
| 2 | 5 | 1 |
| 2 | 10 | 2 |
| 3 | 1 | 1 |
| 3 | 6 | 3 |
| 3 | 7 | 1 |
| 3 | 8 | 1 |
| 4 | 2 | 1 |
| 4 | 3 | 1 |
| 4 | 9 | 2 |
| 4 | 10 | 1 |

FIG. 9

| IMAGE ID | PHOTO CAPTURE DATE | FILE NAME |
|---|---|---|
| 1 | 2004/10/10 | DSC00001.jpg |
| 2 | 2004/10/20 | DSC00002.jpg |
| 3 | 2004/10/20 | DSC00003.jpg |
| 4 | 2004/10/20 | DSC00004.jpg |
| 5 | 2004/10/20 | DSC00007.jpg |
| 6 | 2004/11/30 | DSC00018.jpg |
| 7 | 2004/12/03 | DSC00019.jpg |

FIG. 10

```
<sentence>
  SCHOOL SPORTS DAY LAST YEAR
  <tree description="1/1">
    <phrase index="1" string="SCHOOL SPORTS DAY">
    <syntax kind="NOUN"/>
    <phrase index="2" string="LAST YEAR">
      <syntax kind= "TIME NOUN"/>
      <mean kind="POINT IN TIME"/>
      <mean kind="TIME"/>
    </phrase>
    </phrase>
   </tree>
  </tree>
</sentence>
```

FIG.12

| | | |
|---|---|---|
| YESTERDAY | d-1 | %m %d, %yyyy |
| THE DAY BEFORE YESTERDAY | d-2 | %m %d, %yyyy |
| LAST YEAR | y-1 | %JANUARY 1, yyyy~ %DECEMBER 31, yyyy |
| THE YEAR BEFORE LAST | y-2 | %JANUARY 1, yyyy~ %DECEMBER 31, yyyy |

FIG.13

PHOTO IMAGE RETRIEVAL SYSTEM AND PROGRAM

BACKGROUND

1. Technical Field

Recently, digital cameras are rapidly becoming popular in general household. The digital cameras enable easy image capturing and deletion compared with film cameras of a previous type. The memory card capacity is increased in the digital cameras, and a single piece of memory card is capable of storing 100 or more pieces of photos so that users tend to take a larger number of photos in one use.

2. Related Art

For storage of the resulting larger number of photos, used are an HDD (hard disk) of a personal computer, a photo storage provided with a large-capacity HDD, or others.

As such, the users tend to take 100 or more pieces of photos in one use, if they frequently use their digital cameras, the resulting number of photos may reach a few thousand in a year. To find any specific photo from such a huge pile of photos, there needs to use photo album editing software, or properly and always organize photo storage folders.

The problem here is that constantly organizing folders as such requires the users' efforts, and as the pile of photos gets bigger and bigger, the users may find it suiting to their needs if they can easily find any specific photo from the pile with less effort.

To solve such a problem, there are several methods of finding any specific photo from a large number of photo images by a keyword search. As an example, in Patent Document 1 (JP-A-2002-344721), an image capture device is provided with a keyword button so that any specific keywords can be appended to photo images.

As another example, in Patent Document 2 (JP-A-2000-101894), a plurality of images are grouped, and the resulting groups are each collectively provided with a comment in photo album software or others. These reduce users' efforts of appending keywords to images, but requires efforts of additionally providing comments at the time of capturing or organizing photos.

As still another example, in Patent Document 3 (JP-A-2003-303210), an event information database is provided to skip the procedure of keyword provision to photo images, but this method raises a problem of how to organize and update the event information database.

With such previously-known methods, there problematically requires efforts of additionally providing comments at photo capturing and organizing.

Considered here is information accumulated on a continual basis by individuals for their own, e.g., online diaries called Web logs, or mail exchange on personal computers. Such information includes a large amount of text data about users' activities, including information about date or others.

SUMMARY

An advantage of some aspects of the invention is to provide a photo image retrieval system and method, a recording medium, and a program, all of which are capable of, despite users' vague memory, retrieving not-yet-sorted photo images through input of simple retrieval sentence by establishing a correlation between text data, e.g., diary, and information about photo images.

A first aspect of the invention is directed to a photo image retrieval system that stores a plurality of photo images and a plurality of text data, and extracts and displays any of the photo images using an input retrieval sentence as an index. The photo image retrieval system includes: a photo image database that records data of the photo images together with information about image capture dates; a text database that stores thereon the text data; a text data analysis unit that parses the text data in the text database, and extracts words of the text data; an index database that establishes a correlation, for recording, between information about the words extracted by the text data analysis unit and information about dates when the text data is entered; a retrieval sentence analysis unit that parses the input retrieval sentence, and extracts a retrieval word in the retrieval sentence; a date information extraction unit that extracts, using information about the retrieval word in the retrieval sentence as an index, any of the information about the date when the text data including the retrieval word is entered by referring to the index database; a photo image extraction unit that extracts, using as an index the date when the text data including the retrieval word is entered, any of the photo images captured on the date by referring to the photo image database; and a display unit that displays the photo image extracted by the photo image extraction unit.

Such a configuration enables to parse text data in a text database, extract words of the text data, and establish a correlation, for recording into an index database, between information about the extracted words and information about dates when the text data is entered. Thereafter, the configuration parses a user-input retrieval sentence, extracts a retrieval word found in the retrieval sentence, and using information about the retrieval word as an index, extracts the information about the date of entering the text data including the retrieval word by referring to the index database. Using as an index the date when the text data including the retrieval word is entered, any corresponding photo image captured on the date is extracted for display with reference to a photo image database.

With such a configuration, any specific photo image can be retrieved utilizing text data exemplified by online diaries or electronic mails (hereinafter, e-mails), thereby saving users work to photo images, e.g., comment provision, sorting into folders, or others, at the time of photo taking or photo image capturing into photo image retrieval systems, e.g., personal computers. What is more, with a correlation established between the text data such as diaries and information about photo images, not-yet-sorted photo images can be retrieved, despite users' vague memory, through input of simple retrieval sentence, e.g., school sports day last year.

A second aspect of the invention is directed to a photo image retrieval system that stores a plurality of photo images and a plurality of text data, and extracts and displays any of the photo images using an input retrieval sentence as an index. The photo image retrieval system includes: a photo image database that records data of the photo images together with information about image capture dates; a text database that stores thereon the text data; a text data analysis unit that parses the text data in the text database, and extracts words of the text data; a page table that records, through provision of a page identification (ID) to each of the text data, dates when the text data is recorded into the text database and storage locations thereof; a word table that provides a word ID to each of the words extracted by the text data analysis unit for recording together with a word name; a word/page table that records the word ID of each of the words extracted by the text data analysis unit using the page ID as an index; a retrieval sentence analysis unit that parses the input retrieval sentence, and extracts words in the retrieval sentence; a retrieval word acquisition unit that acquires a retrieval word from the words extracted by the retrieval sentence analysis unit; a date range information acquisition unit that acquires information about a date range from the word extracted by the retrieval sentence analysis unit; a date range page specification unit that specifies, using as an index the information about the date range, page IDs fitting in the date range by referring to the page table; a word ID acquisition unit that extracts, using as an index the retrieval word, any of the word IDs of the word equivalent to the retrieval word by referring to the word table; a page ID acquisition unit that acquires, using as an index the word ID extracted by the word ID acquisition unit, the page IDs including the word by referring to the word/page table; a date specification unit that extracts, using as an index the page ID acquired by the page ID acquisition unit, any of the page IDs fitting in the date range specified by the date range page specification unit by referring to the page table, and specifies the date of the text data under the extracted page ID; a photo image extraction unit that extracts, using as an index the date specified by the date specification unit, any of the photo images captured on the date by referring to the photo image database; and a display unit that displays the photo image extracted by the photo image extraction unit.

Such a configuration enables to provide every text data with a page ID, and make a recording of recording dates and storage locations of the text data to a page table. Also in the configuration, the text data is parsed, words of the text data are extracted, and each of the extracted words is provided with a word ID for recording to a word table together with a word name. Using the page IDs as indexes, the IDs of the extracted words are recorded to a word/page table. A user-input retrieval sentence is then parsed, words of the retrieval sentence are extracted, and from the extracted words, information about a date range and a retrieval word are acquired. Using as an index the date range information, a page table is referred to for acquiring any of the page IDs fitting in the specified date range. The retrieval word is then used as an index, and the word table is referred to for extracting the word ID of the word equivalent to the retrieval word, and the word ID is used as an index, the word/page table is referred to for extracting any of the page IDs including the word. Thereafter, using thus extracted page ID as an index, the page table is referred to for extracting any of the page IDs fitting in the specified date range, i.e., the page ID including the retrieval word, so that the text data including the extracted page ID is specified by date. Thus defined date of the text data is then used as an index, and a photo image database is referred to for extracting any of the photo images captured on the date.

With such a configuration, any specific photo image can be retrieved utilizing text data exemplified by online diaries or e-mails, thereby saving users work to photo images, e.g., comment provision, sorting into folders, or others, at the time of photo taking or photo image capturing into photo image retrieval systems, e.g., personal computers. What is more, with a correlation established between the text data such as diaries and information about photo images, not-yet-sorted photo images can be retrieved, despite users' vague memory, through input of simple retrieval sentence, e.g., school sports day last year.

The photo image retrieval system according to some aspects of the invention further includes: a weight-assigning dictionary in which a previously-selected word is assigned with a weight and entered; a unit that refers to the weight-assigning dictionary when making a recording of the word ID and the word name to the word table, and records a word class and information about weight assignment together with the word ID and the word name; and a unit that records, when making a recording of the page ID and the word ID to the word/page table, information about an appearance frequency of the word in the text data under the page ID together with the page ID and the word ID.

This configuration additionally records, when making a recording of the word ID and the word name to the word table, a word class and information about weight assignment together with the word ID and the word name. The configuration also additionally records, when making a recording of the page ID and the word ID to the word/page table, information about the appearance frequency of the word in the text data together with the page ID and the word ID.

This allows to use TFIDF (term frequency inverted document frequency) or others to determine the similarity level between a retrieval word and words entered in a word table in an index database (hereinafter, index DB).

In the photo image retrieval system according to some aspects of the invention, the text data is diary data that is recorded on a Web diary server, and the photo image retrieval system includes a text data enter/acquisition unit that enters the diary data into the Web diary server, and reads the diary data from the Web diary server.

This configuration allows to use diary data recorded on a Web diary server as text data, and retrieve any specific photo image using a retrieval sentence thanks to a correlation established with photo images in a photo image database.

As such, using diary data accumulated on a daily basis on the Web diary server by users for their own, not-yet-sorted photo images can be retrieved, despite users' vague memory, through input of simple retrieval sentence, e.g., school sports day last year.

In the photo image retrieval system according to some aspects of the invention, the text data is e-mail data, and the photo image retrieval system includes an e-mail reading unit.

This configuration allows to use e-mail data as text data, and retrieve any specific photo image using a retrieval sentence thanks to a correlation established with photo images in a photo image database.

As such, using e-mail data coming from and going to users, not-yet-sorted photo images can be retrieved, despite users' vague memory, through input of simple retrieval sentence, e.g., school sports day last year.

In the photo image retrieval system according to some aspects of the invention, the photo images are captured by a camera-equipped mobile communications terminal, the text data is e-mail data in the camera-equipped mobile communications terminal, and the photo image retrieval system includes a unit of establishing a communications connection with the camera-equipped mobile communications terminal.

Such a configuration enables to, through a connection established between a photo image retrieval system and a camera-equipped mobile communications terminal, capture photo image data and e-mail data stored in the camera-equipped mobile communications terminal into the photo image retrieval system for recording. Thereafter, with the e-mail data serving as text data, any specific photo image is retrieved using a retrieval sentence thanks to a correlation established with photo images captured by the camera-equipped mobile communications terminal.

As such, by establishing a correlation with the e-mail data, any specific photo image can be retrieved from those others not-yet-sorted in the camera-equipped mobile communications terminal, despite users' vague memory, through input of simple retrieval sentence, e.g., school sports day last year.

In the photo image retrieval system according to some aspects of the invention, the photo image retrieval system is equipped in a camera-equipped mobile communications terminal, the text data is e-mail data, and the photo images are captured by a camera of the camera-equipped mobile communications terminal.

Such a configuration enables to equip a photo image retrieval system in a camera-equipped mobile communications terminal, use e-mail data as text data, and with a correlation established with photo images captured by and stored in the camera-equipped mobile communications terminal, retrieve any specific photo image using a retrieval sentence.

As such, by establishing a correlation with the e-mail data, any specific photo image can be retrieved from not-yet-sorted those others stored in the camera-equipped mobile communications terminal, despite users' vague memory, through input of simple retrieval sentence, e.g., school sports day last year.

A third aspect of the invention is directed to a photo image retrieval method in a photo image retrieval system that stores a plurality of photo images and a plurality of text data, and extracts and displays any of the photo images using an input retrieval sentence as an index. The photo image retrieval method includes, for execution by a computer in the photo image retrieval system: recording data of the photo images to a photo image database together with image capture dates; recording the text data on a text database; parsing the text data in the text database, and extracting words of the text data; establishing a correlation, for recording into an index database, between information about the words extracted in the analyzing the text data and information about dates when the text data is entered; parsing the input retrieval sentence, and extracting a retrieval word in the retrieval sentence; extracting, using information about the retrieval word in the retrieval sentence as an index, any of the information about the date when the text data including the retrieval word is entered by referring to the index database; extracting, using as an index the information about the date when the text data including the retrieval word is entered, any of the photo images captured on the date by referring to the photo image database; and displaying the photo image extracted in the extracting the photo image.

Such a method enables to parse text data in a text database, extract words of the text data, and establish a correlation, for recording into an index database, between information about the extracted words and information about dates when the text data is entered. Thereafter, the method parses a user-input retrieval sentence, extracts a retrieval word found in the retrieval sentence, and using information about the retrieval word as an index, extracts the information about the date of entering the text data including the retrieval word by referring to the index database. Using as an index the date when the text data including the retrieval word is entered, any corresponding photo image captured on the date is extracted for display with reference to a photo image database.

With such a method, any specific photo image can be retrieved utilizing text data exemplified by online diaries or e-mails, thereby saving users work to photo images, e.g., comment provision, sorting into folders, or others, at the time of photo taking or photo image capturing into photo image retrieval systems, e.g., personal computers. What is more, with a correlation established between the text data such as diaries and information about photo images, not-yet-sorted photo images can be retrieved, despite users' vague memory, through input of simple retrieval sentence, e.g., school sports day last year.

A fourth aspect of the invention is directed to a computer-recordable recording medium that stores a program for execution by a computer in a photo image retrieval system that stores a plurality of photo images and a plurality of text data, and extracts and displays any of the photo images using an input retrieval sentence as an index. The program includes: recording data of the photo images to a photo image database together with image capture dates; recording the text data on a text database; parsing the text data in the text database, and extracting words of the text data; establishing a correlation, for recording into an index database, between information about the words extracted in the analyzing the text data and information about dates when the text data is entered; parsing the input retrieval sentence, and extracting a retrieval word in the retrieval sentence; extracting, using information about the retrieval word in the retrieval sentence as an index, any of the information about the date when the text data including the retrieval word is entered by referring to the index database; extracting, using as an index the information about the date when the text data including the retrieval word is entered, any of the photo images captured on the date by referring to the photo image database; and displaying the photo image extracted in the extracting the photo image.

A fifth aspect of the invention is directed to a program for execution by a computer in a photo image retrieval system that stores a plurality of photo images and a plurality of text data, and extracts and displays any of the photo images using an input retrieval sentence as an index. The program includes: recording data of the photo images to a photo image database together with image capture dates; recording the text data on a text database; parsing the text data in the text database, and extracting words of the text data; establishing a correlation, for recording, between information about the words extracted in the analyzing the text data and information about dates when the text data is entered; parsing the input retrieval sentence, and extracting a retrieval word in the retrieval sentence; extracting, using information about the retrieval word in the retrieval sentence as an index, any of the information about the date when the text data including the retrieval word is entered by referring to the index database; extracting, using as an index the information about the date when the text data including the retrieval word is entered, any of the photo images captured on the date by referring to the photo image database; and displaying the photo image extracted in the extracting the photo image.

BRIEF DESCRIPTION OF THE DRAWINGS

The invention will be described with reference to the accompanying drawings, wherein like numbers reference like elements.

FIG. 6 is a diagram showing an exemplary weight-assigning dictionary.

FIG. 7 is a diagram showing an exemplary page table in an index DB.

FIG. 8 is a diagram showing an exemplary word table in the index DB.

FIG. 9 is a diagram showing an exemplary word/page table in the index DB.

FIG. 10 is a diagram showing an exemplary photo image DB.

FIG. 12 is diagram showing an exemplary parsing result.

FIG. 13 is a diagram showing an exemplary conversion rule for a date range.

DESCRIPTION OF EXEMPLARY EMBODIMENTS

By referring to the accompanying drawings, most preferable embodiments of the invention will be described.

Figure 1:
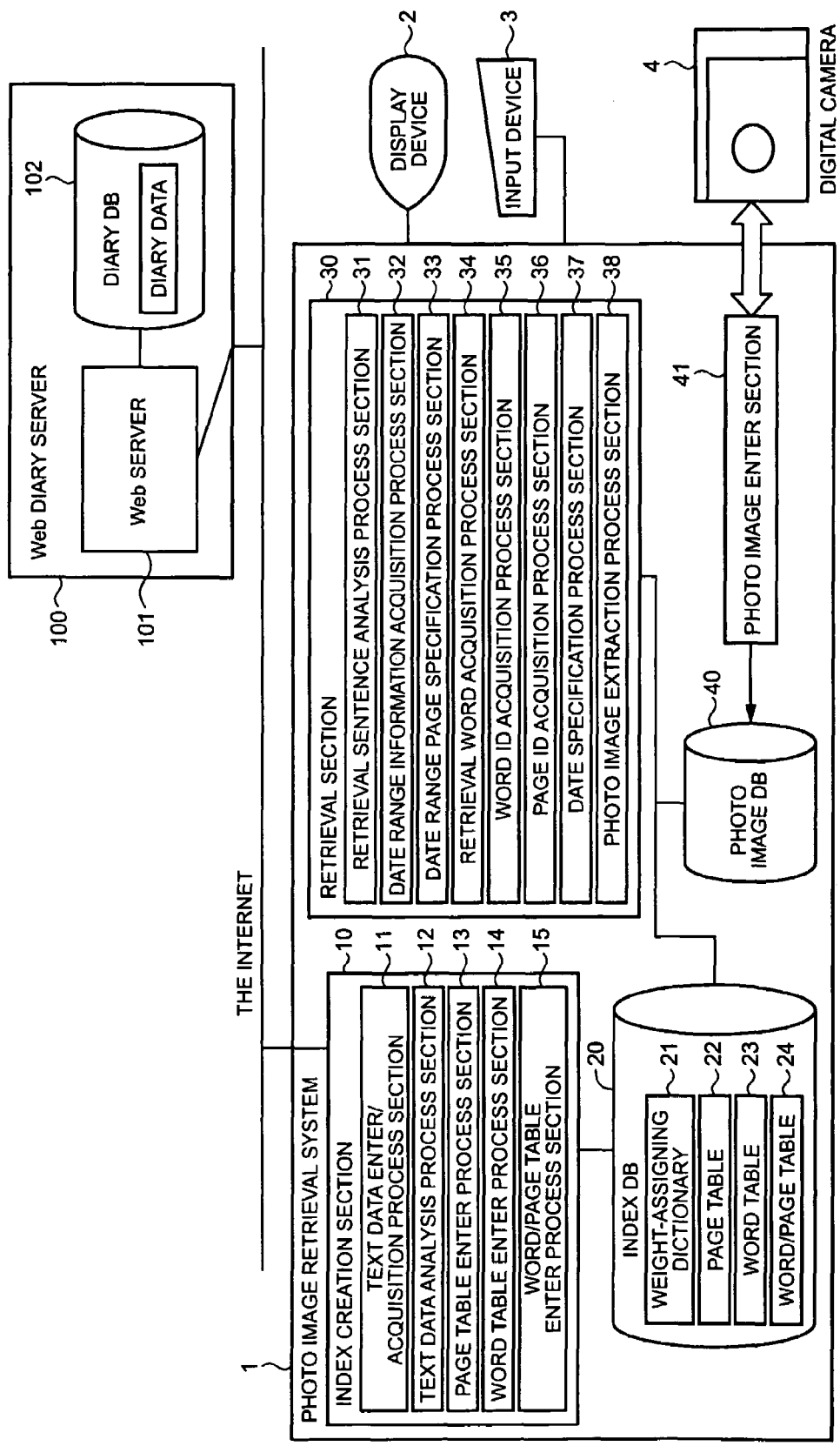
FIG. 1 is a function block diagram showing a first configuration example of a photo image retrieval system of the invention.

FIG. 1 is a function block diagram showing a first configuration example of a photo image retrieval system of the invention.

In FIG. 1, a photo image retrieval system 1 is exemplified by a personal computer, and is connected with peripherals of a display device 2 such as liquid crystal display, and an input unit 3 such as mouse or keyboard. The photo image retrieval system 1 is connected with a digital camera 4 so as to capture data therefrom about any captured photo images. After data capturing, the photo image data is recorded to a photo image DB (database) 40.

The photo image retrieval system 1 includes therein an index creation section 10, an index DB 20, a retrieval section 30, the photo image DB 40, and a photo image enter section 41. Specifically, the index creation section 10 serves to create index information for use for retrieving text data, and the index DB 20 is provided for use by the index creation section 10. The retrieval section 30 serves to retrieve photo images, and the photo image enter section 41 is connected to the digital camera 4 for recoding photo image data to the photo image DB 40.

The photo image retrieval system 1 is connected to a Web diary server 100 over the Internet. The Web diary server 100 is provided with a diary DB (text database) 102 that stores data about users' Web diaries, and a Web server 101. The users edit and browse their diaries over a Web browser inside of the photo image retrieval system 1, e.g., personal computer.

The index creation section 10 in the photo image retrieval system 1 is configured by various types of process sections for executing a process of creating index information.

A text data enter/acquisition process section 11 goes through a process of entering (writing) diary data (text data) to the diary DB 102 of the Web diary server 100, and reading the diary data from the Web diary server 100.

The text data analysis process section (text data analysis unit) 12 goes through a process of parsing the diary data read from the diary DB (text database) of the Web diary server 100, and extracting words in the text.

A page table enter process section 13 goes through a process of assigning a page ID to every diary data read from the diary DB 102, and recording information about the diary data to a page table 22 inside of the index DB 20. The information about the diary data includes dates entered to the Web diary server 100, or information about storage locations, e.g., URL information.

FIG. 7 is a diagram showing an exemplary page table 22 inside of the index DB 20. The page table 22 carries therein, under the index of page ID, dates of entering the diary data to the Web diary server 100, and URLs indicating the storage locations of the diary data. The information read from the Web diary server 100 about the diary data is recorded to this page table.

After the diary data is subjected to a parsing process by the text data analysis section 12, a word table enter process section 14 goes through a process of assigning a word ID to every word extracted as a result of the parsing process. The word table enter process section 14 also goes through a process of recording information about word names and weight assignment to a word table by referring to a weight-assigning dictionary 21.

FIG. 8 is a diagram showing an exemplary word table 23, which carries therein information about the words extracted from the text in the diary data under the index of word ID. The information about the words includes word names, e.g., movie, word classes, e.g., noun, and weights, e.g., 5.

Under the index of page ID used in the page table, a word/page table enter process section 15 goes through a process of recording information about the diary data for the page ID to a word/page table 24. The information about the diary data includes IDs of the words extracted by the text data analysis process section 12, and information about the usage frequency of each of the words.

FIG. 9 is a diagram showing an exemplary word/page table 24, which carries therein, under the index of page ID for the diary data, the word IDs appeared in the diary data for the page ID, and the appearance frequency of each of the words.

FIG. 6 is a diagram showing an exemplary weight-assigning dictionary, which is a system-provided dictionary carrying words that are previously selected on the assumption that they are highly likely serving as retrieval words for event names, and weighted and entered.

A retrieval sentence analysis section (retrieval sentence analysis unit) 31 inside of the retrieval section 30 goes through a process of parsing a user-input retrieval sentence coming from the input device 3, e.g., school sports day last year, and extracting words included in the retrieval sentence.

A date range information acquisition process section (date range information acquisition unit) 32 is a process section of acquiring information about a date range from the words extracted by the retrieval sentence analysis section 31.

A date range page specification process section (date range page specification unit) 33 is a process section of referring to the page table 22 under the index of date range information derived by the date range information acquisition process section 32, and specifying the page ID fitting in the date range.

A retrieval word acquisition process section 34 goes through a process of acquiring a retrieval word from the words extracted by the retrieval sentence analysis process section 31.

A word ID acquisition process section 35 goes through a process of referring to the word table 23 under the index of retrieval word extracted by the retrieval word acquisition process section 34, and extracting the word ID of the word equivalent to the retrieval word.

A page ID acquisition process section (page ID acquisition unit) 36 is a process section of acquiring, under the index of the word ID extracted by the word ID acquisition process section 35, the page ID including the word by referring to the word/page table 24.

A date specification process section (date specification unit) 37 is a process section of extracting, under the index of page ID acquired by the page ID acquisition process section 36, the page ID (the page ID including the retrieval word) from those others fitting in the date range specified by the date range page specification process section 33, and specifying the date of the text data under the extracted page ID, by referring to the page table 22.

A photo image extraction process section (photo image extraction unit) 38 goes through a process of extracting, under the index of date specified by the date specification process section 37, the photo images captured on the date by referring to the photo image DB 40. The photo images extracted by the photo image extraction process section 38 are displayed on the display device (display unit) 2.

FIG. 10 is a diagram showing an exemplary photo image DB 40, which is recorded with the photo capture dates, and photo image data, e.g., JPEG files, under the index of image ID.

Note here that the above-described photo image retrieval system 1 is not restrictive to a personal computer, and a mobile computer or any other types of information equipment will do as long as they can be connected to both the Internet and the digital camera 4.

In FIG. 1 example, the diary data (text data) is exemplarily stored in the Web diary server 100. Alternatively, the diary data may be stored in the photo image retrieval system 1. The text data may be information about e-mails. For example, when the photo image retrieval system 1 is a personal computer or others, the text data may be e-mail data stored in the personal computer.

As such, described above is the first configuration example of the photo image retrieval system of the invention. The photo image retrieval system of the invention is capable of retrieving any specific photo image using text data exemplified by online diary. This thus saves users work to photo images, e.g., comment provision, sorting into folders, or others, at the time of photo taking or photo image capturing into photo image retrieval systems, e.g., personal computers. What is more, with a correlation established between the text data such as diaries and information about photo images, not-yet-sorted photo images can be retrieved, despite users' vague memory, through input of simple retrieval sentence, e.g., school sports day last year.

Figure 2:
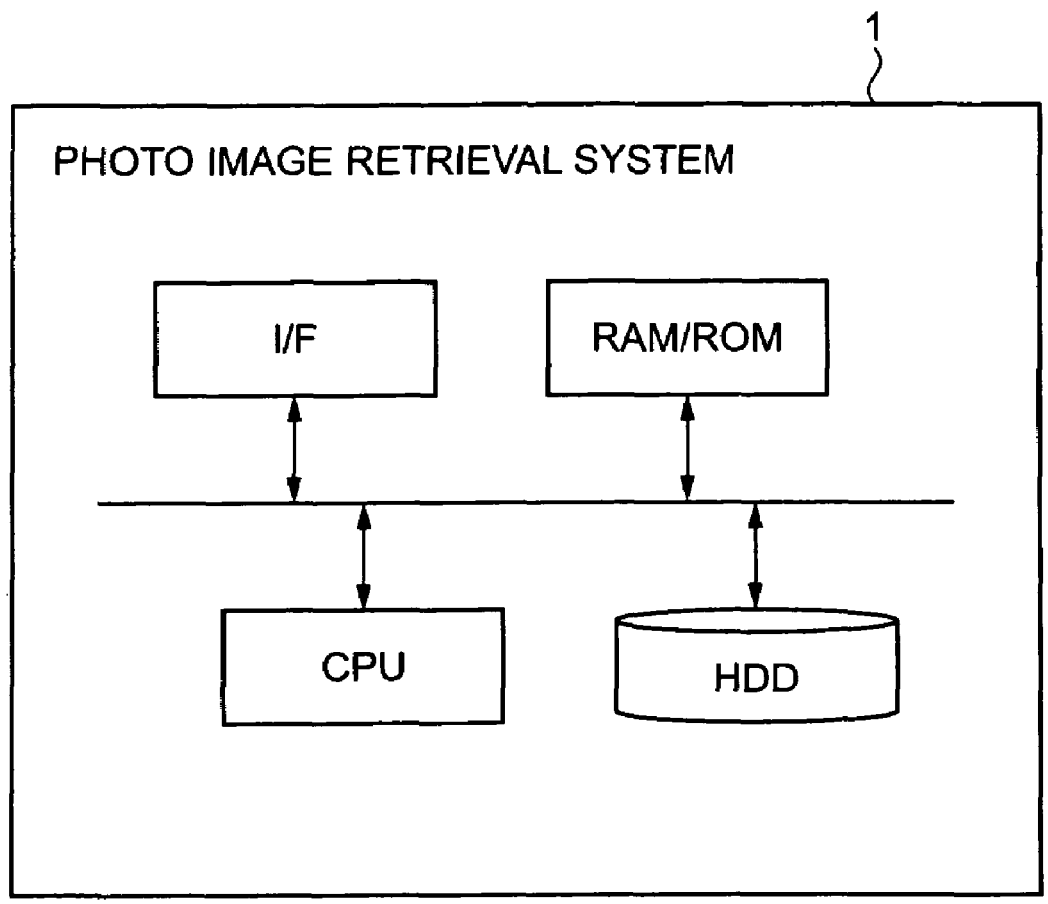
FIG. 2 is a diagram showing an exemplary hardware configuration of the photo image retrieval system.

FIG. 2 is a diagram showing an exemplary hardware configuration of a photo image retrieval system. As shown in this drawing, the photo image retrieval system 1 has such a hardware configuration as shown in FIG. 2. The hardware configuration includes a CPU (Central Processing Unit), a RAM (Ransom Access Memory)/ROM (Read Only Memory), an HDD (Hard Disk Drive), an I/F (Interface), and others. In the photo image retrieval system 1, the CPU reads a program recorded on the RAM/ROM or HDD, and goes through function processes for the process sections 11 to 15 in the index creation section 10, and the process sections 31 to 38 in the retrieval section 30. The index DB 20 and the photo image DB 40 are configured by the HDD.

Figure 3:
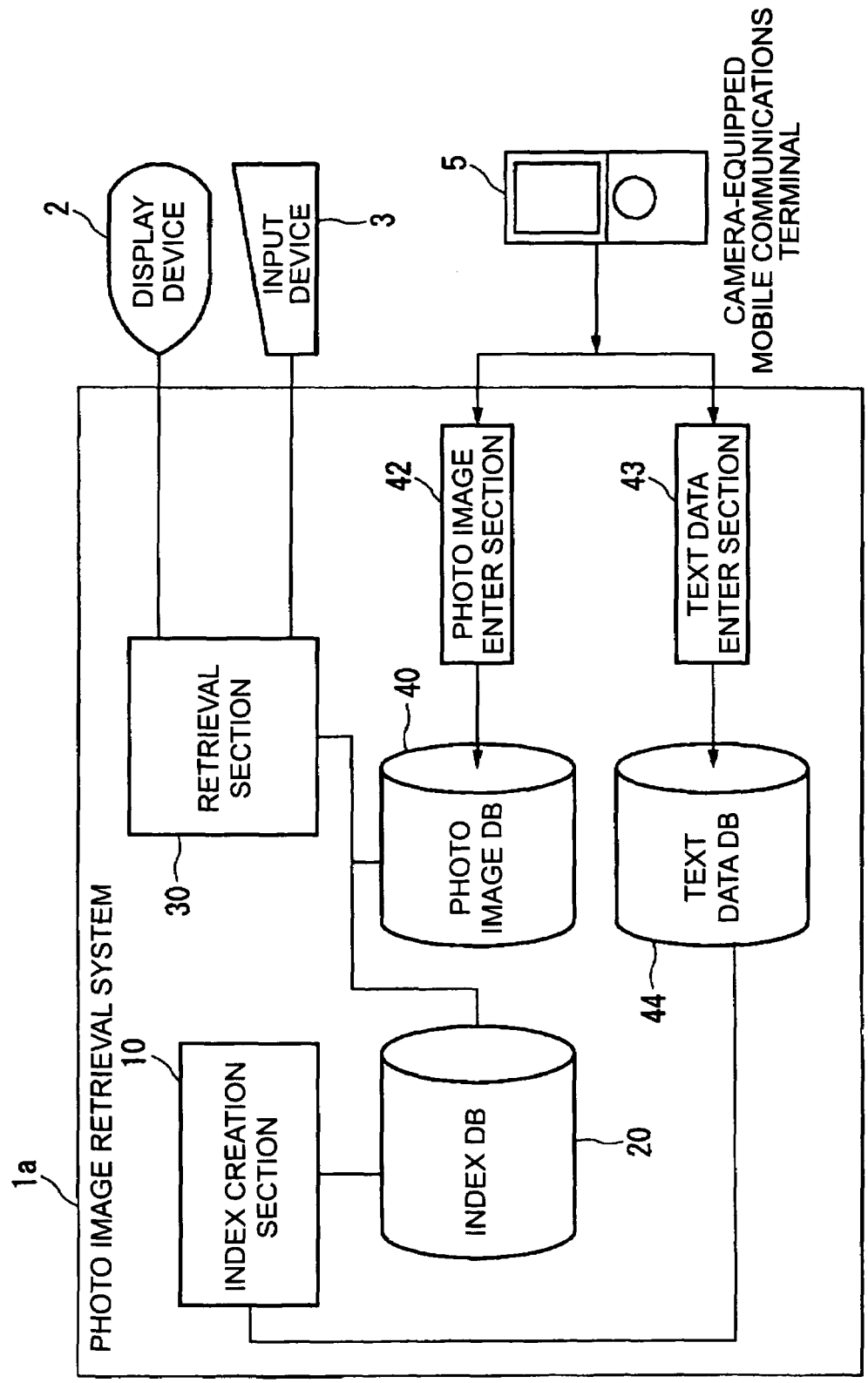
FIG. 3 is a function block diagram showing a second configuration example of the photo image retrieval system of the invention.

FIG. 3 is a function block diagram showing a second configuration example of the photo image retrieval system 1 of the invention, in which a camera-equipped mobile communications terminal 5 is provided as an alternative to a digital camera.

In FIG. 3 example, a photo image retrieval system 1a, e.g., personal computer, is connected with the camera-equipped mobile communications terminal 5, e.g., mobile phone, and captures photo images and e-mail data captured by the mobile communications terminal 5. In this configuration example, e-mail data coming from and going to the mobile communications terminal 5 is used as an alternative to the Web diary data (refer to the diary DB 102 of FIG. 1).

In FIG. 3, the photo images captured by the camera-equipped mobile communications terminal 5 are recorded to the photo image DB 40 via a photo image enter section 42. The e-mail data in the camera-equipped mobile communications terminal 5 is recorded to the text data DB 40 via a text data enter section 43. The e-mail data recorded to the text data DB 44 is used by the index creation section 10 as text data. Here, the components of the index creation section 10, the index DB 20, the retrieval section 30, and the photo image DB 40 all are similar in configuration to those described by referring to FIG. 1.

Such a configuration enables to retrieve photo images captured by the camera-equipped mobile communications terminal 5 utilizing the e-mail text data. This thus saves users work to photo images, e.g., comment provision, sorting into folders, or others, at the time of photo taking. What is more, with a correlation established between the e-mail text data and information about photo images, not-yet-sorted photo images can be retrieved, despite users' vague memory, through input of simple retrieval sentence.

Figure 4:
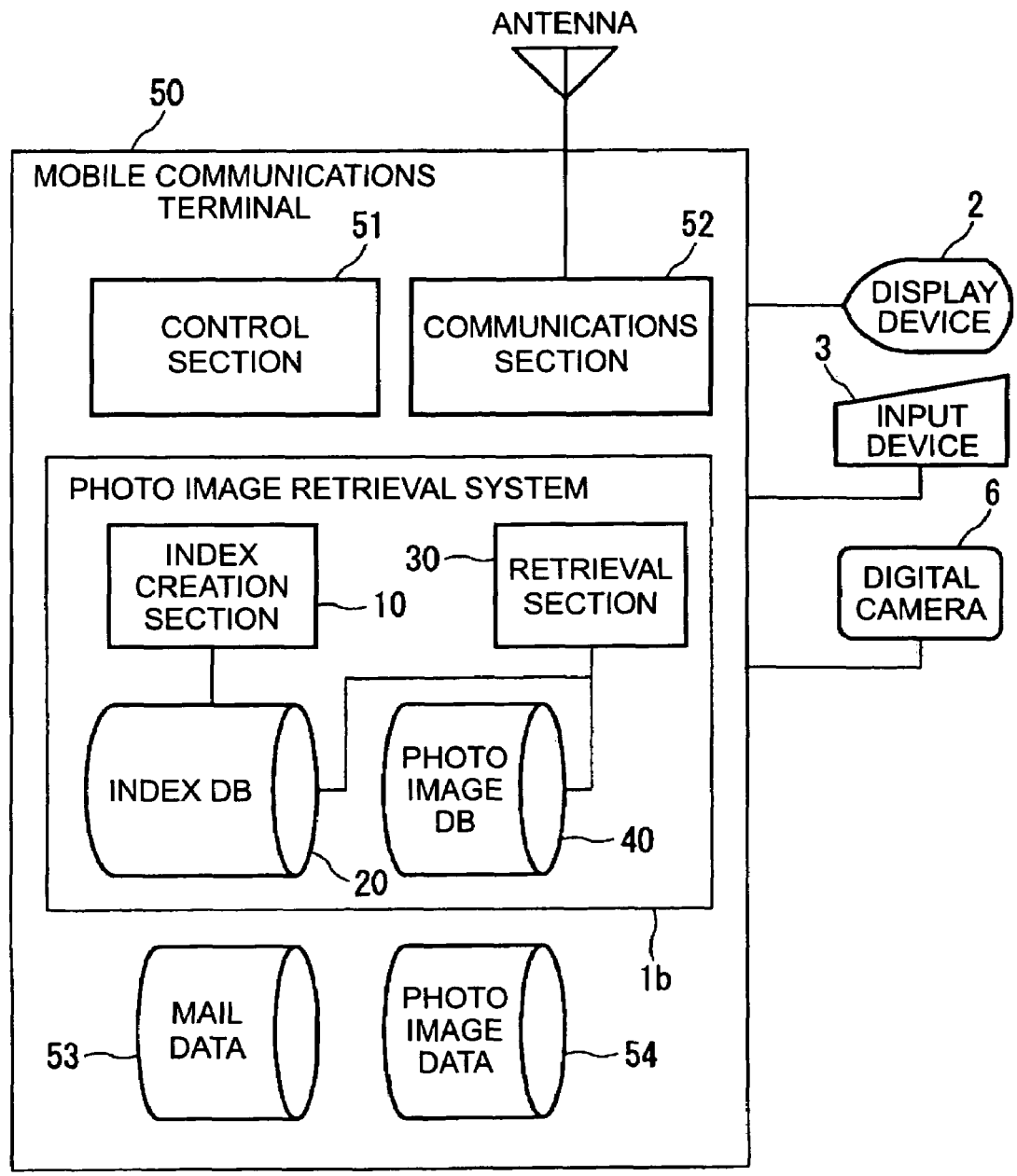
FIG. 4 is a function block diagram showing a third configuration example of the photo image retrieval system of the invention.

FIG. 4 is a function block diagram showing a third configuration example of the photo image retrieval system of the invention, in which a photo image retrieval system 1b is equipped inside of a mobile communications terminal 50. The components of the index creation section 10, the index DB 20, the retrieval section 30, and the photo image DB 40 are incorporated in the mobile communications terminal 50.

In the configuration, a control section 51 is a process section of exercising control collectively over the mobile communications terminal 50, and a communications section 52 is a process section of taking in charge of wireless communications with a base station. Mail data 53 is e-mail data stored in the mobile communications terminal 50, and photo image data 54 is data of photo images captured by a digital camera 6 incorporated in or attached to the mobile communications terminal 50. Here, the components of the index creation section 10, the index DB 20, the retrieval section 30, and the photo image DB 40 all are similar in configuration to those described by referring to FIG. 1.

This thus enables to establish a correlation between e-mail data (text data) and photo images captured by and stored in the mobile communications terminal 50, e.g., mobile phone so that any specific photo image can be retrieved using a user-input retrieval sentence.

Figure 5:
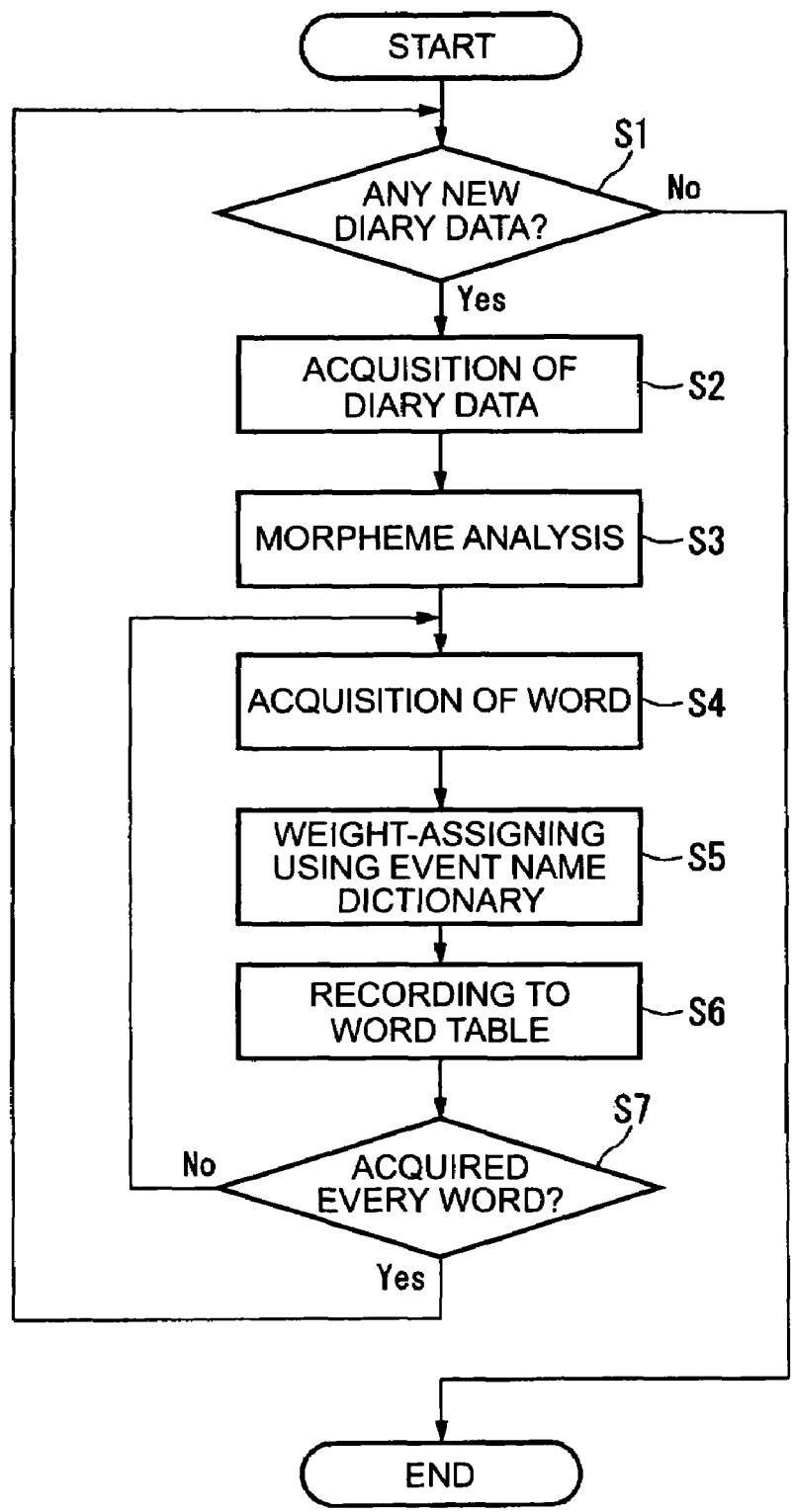
FIG. 5 is a flowchart showing the procedure of an index creation process.

FIG. 5 is a flowchart showing the procedure of an index creation process in the index creation section 10. This index creation process is described by taking as an example the photo image retrieval system 1 of FIG. 1. By referring to FIG. 5, the process procedure is described below.

First of all, the photo image retrieval system 1 is connected to the Web server 101 of the Web diary server 100 for communications therewith to check whether the diary BD carries any new diary data (step S1). If there is any new diary data, the diary data is read (step S2), and the index creation process is executed. If there is no new diary data, the procedure is ended.

After the diary data is acquired, the text in the diary data is subjected to morpheme analysis, and the diary text is broken down into words (steps S3 and S4).

The words as a result of morpheme analysis are each assigned with a weight by referring to the weight-assigning dictionary 21 of FIG. 6, and the resulting weight-assigned words are recorded to the word table 23 in the index DB 20 (step S5). Herein, the weight values in the weight-assigning dictionary 21 are all system-provided, and alternatively, users may take charge of value writing.

Under the index of page ID, the word/page table 24 (FIG. 9) in the index DB 20 is recorded with the words appearing in the text of the diary data, and their appearance frequency per page (step S6).

After the words in the text of the diary data are thoroughly acquired (step S7), the procedure returns to step S1 to see whether there is any new diary data left not acquired. If every data has been acquired, the index creation process is ended.

Note here that the photo image retrieval system can be a personal computer. With this being the case, the index creation process can be executed on a regular basis utilizing an idle time of the personal computer, i.e., time when no application is running.

Figure 11:
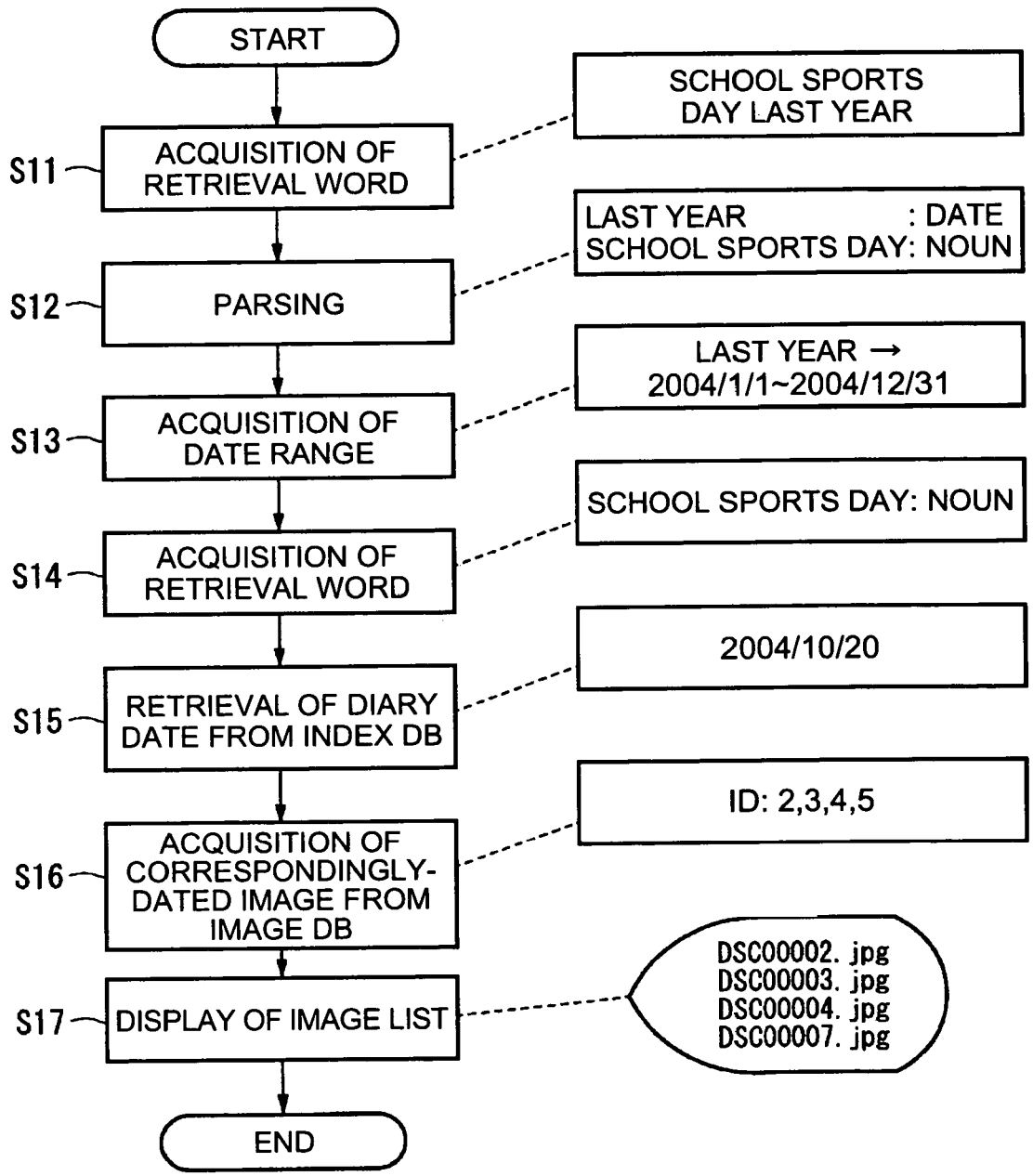
FIG. 11 is a flowchart showing the procedure of a photo image retrieval process.

FIG. 11 is a flowchart showing the retrieval procedure for photo image retrieval, specifically showing the process flow of photo image retrieval in the retrieval section 30 and its exemplary execution example. By referring to FIG. 11, the process procedure of photo image retrieval is described below.

First of all, a user-input retrieval sentence is acquired, e.g., "school sports day last year" (step S11).

The retrieval sentence is then parsed (step S12), and is broken down into a portion of specified date range, and a portion of a retrieval word indicating event or activities. In this example, "last year" is extracted as a portion indicating a date, and "school sports day" is extracted as a noun of the retrieval word. FIG. 12 shows an exemplary parsing result.

From the parsing result, the portion indicating the date range is acquired for conversion into a date range (step S13). In this example, "last year" is converted into the date range from Jan. 1, 2004 to Dec. 31, 2004. The conversion rule for the date range is of a table of FIG. 13, calculating from the today's date. Note here that a reference sign y in FIG. 13 denotes "year", and a reference sign d denotes "day".

Thereafter, any other portions are extracted from the parsing result as a retrieval word (step S14). In this example, the extracted retrieval word is "school sports day".

After finding the date range and the retrieval word, the index DB 20 is referred to for extracting the page of the diary including the retrieval word in the date range so that the date of the diary is derived (step S15). In this example, the page table 22 in the index DB 20 of FIG. 7 is first referred to for deriving the page ID corresponding to the date range, and the page IDs 1, 2, 3, and 4 are found corresponding. Thereafter, the word table 23 of FIG. 8 is referred to for acquiring the word ID "5" for "school sports day". The word/page table 24 of FIG. 9 is then referred to for finding the page ID "2" corresponding to the acquired word ID "5". The page table 22 of FIG. 7 is referred to again for extracting the date "Oct. 20, 2004" corresponding to the page ID "2" fitting in the range of the page IDs 1, 2, 3, and 4.

The image DB 40 (FIG. 10) is next referred to for finding any image corresponding to the date, i.e., "Oct. 20, 2004" (step S16), and the image IDs 2, 3, 4, and 5 are found corresponding. Thus found corresponding images are eventually displayed, and the retrieval process is ended (step S17).

By going through such a retrieval procedure, only with a user-input simple retrieval sentence, any photo image relating to the retrieval sentence can be automatically extracted and displayed.

In the above-described retrieval procedure, for the sake of brevity, described is the case of assigning no weight to words, and of not using information about appearance frequency. This is surely not restrictive, and assigning weight to words and using information about appearance frequency allows to use TFIDF or others to determine the similarity level between words in a retrieval sentence and words entered in a word table in an index DB.

The photo image retrieval system of the invention embodied as above enables to retrieve any specific photo image by using text data such as Web diaries or e-mails, thereby saving users work to photo images, e.g., comment provision, sorting into folders, or others, at the time of photo taking or photo image capturing into personal computers.

What is more, writing diaries and e-mailing are considered as objective, and thus users feel considerably less burdened compared with doing comment provision for photo image retrieval or sorting photo images into folders.

As shown in FIG. 2, the photo image retrieval system of the invention includes therein a computer system. The series of procedure for the above-described processes is recorded on a computer-readable recording medium in the form of a program, and by the computer reading this program for execution, the above-described processes are accordingly executed.

That is, the processes in the index creation section 10, the retrieval section 30, and others are implemented by a central processor such as CPU reading the program into a main storage unit such as ROM or RAM for information processing and calculation.

Here, the computer-readable recording medium includes magnetic disks, magneto-optic disks, CD-ROMS, DVD-ROMS, semiconductor memories, and others. As an alternative manner for program execution, the computer program may be distributed to the computer over a communications line, and the program-received computer may execute the program.

While the embodiments of the invention have been described in detail, the foregoing description is in all aspects illustrative and not restrictive. It is understood that numerous other modifications and variations can be devised for the photo image retrieval system without departing from the scope of the invention.

The entire disclosure of Japanese Patent Application No. 2005-048634, filed Feb. 24, 2005 is expressly incorporated by reference herein.

What is claimed is:

1. A photo image retrieval system that stores a plurality of photo images and a plurality of text data, and extracts and displays any of the photo images using an input retrieval sentence as an index, the system comprising:

a processor;

a photo image database that records data of the photo images together with information about image capture dates;

a text database that stores thereon the text data;

a text data analysis unit that parses the text data in the text database, and extracts words of the text data;

a page table that records, through provision of a page identification (ID) to each of the text data, dates when the text data is recorded into the text database and storage locations thereof;

a word table that provides a word ID to each of the words extracted by the text data analysis unit for recording together with a word name;

a word/page table that records the word ID of each of the words extracted by the text data analysis unit using the page ID as an index;

a retrieval sentence analysis unit that parses the input retrieval sentence, and extracts words in the retrieval sentence;

a retrieval word acquisition unit that acquires a retrieval word from the words extracted by the retrieval sentence analysis unit;

a date range information acquisition unit that acquires information about a date range from the words extracted by the retrieval sentence analysis unit;

a date range page specification unit that specifies, using as an index the information about the date range, page IDs fitting in the date range by referring to the page table;

a word ID acquisition unit that extracts, using as an index the retrieval word, any of the word IDs of the word equivalent to the retrieval word by referring to the word table;

a page ID acquisition unit that acquires, using as an index the word ID extracted by the word ID acquisition unit, the page IDs including the word by referring to the word/page table;

a date specification unit that extracts, using as an index the page ID acquired by the page ID acquisition unit, any of the page IDs fitting in the date range specified by the date range page specification unit by referring to the page table, and specifies the date of the text data under the extracted page ID;

a photo image extraction unit that extracts, using as an index the date specified by the date specification unit, any of the photo images captured on the date by referring to the photo image database; and a display unit that displays the photo image extracted by the photo image extraction unit.

2. The photo image retrieval system according to claim 1, further comprising:

a weight-assigning dictionary in which a previously-selected word is assigned with a weight and entered;

a unit that refers to the weight-assigning dictionary when making a recording of the word ID and the word name to the word table, and records a word class and information about weight assignment together with the word ID and the word name; and a unit that records, when making a recording of the page ID and the word ID to the word/page table, information about an appearance frequency of the word in the text data under the page ID together with the page ID and the word ID.

3. The photo image retrieval system according to claim 1, wherein the text data is diary data that is recorded on a Web diary server, and the photo image retrieval system includes a text data enter/acquisition unit that enters the diary data into the Web diary server, and reads the diary data from the Web diary server.

4. The photo image retrieval system according to claim 1, wherein the text data is electronic-mail (e-mail) data, and the photo image retrieval system includes an e-mail reading unit.

5. The photo image retrieval system according to claim 1, wherein the photo images are captured by a camera-equipped mobile communications terminal, the text data is e-mail data in the camera-equipped mobile communications terminal, and the photo image retrieval system includes a unit of establishing a communications connection with the camera-equipped mobile communications terminal.

6. The photo image retrieval system according to claim 1, wherein the photo image retrieval system is equipped with a camera-equipped mobile communications terminal, the text data is e-mail data, and the photo images are captured by a camera of the camera-equipped mobile communications terminal.

* * * * *